United States Patent [19]

Kho

[11] Patent Number: 4,900,043
[45] Date of Patent: Feb. 13, 1990

[54] WHEEL HOLDING BRACKETS ATTACHED TO SUITCASES

[76] Inventor: Dick T. Kho, P.O. Box 34454, West Los Angeles, Calif. 90034

[21] Appl. No.: 190,394

[22] Filed: May 5, 1988

[51] Int. Cl.$^4$ ............................................... B62B 1/12
[52] U.S. Cl. ....................................... 280/37; 24/647; 74/527; 74/529; 190/18 A; 280/7.12; 280/47.26; 292/DIG. 38; 403/330
[58] Field of Search ............... 280/37, 47.13 R, 47.17, 280/47.24, 74.26, 7.12, 7.13, 8; 24/647; 292/DIG. 38, 216, 204; 74/527, 529; 403/330, 326, 328; 190/18 A

[56] References Cited

U.S. PATENT DOCUMENTS

| 387,009 | 7/1888 | Rammoser | 24/647 |
| 528,939 | 11/1894 | Grabill | 280/47.13 R |
| 1,269,467 | 6/1918 | Leonard et al. | 292/216 |
| 2,415,334 | 2/1947 | Brown | 280/47.26 |
| 2,926,923 | 3/1960 | Browne | 280/47.26 |
| 3,711,110 | 1/1973 | Logerquist | 280/37 |
| 3,997,038 | 12/1976 | Walker | 190/18 A |
| 4,113,397 | 9/1978 | Snyder | 403/326 |

FOREIGN PATENT DOCUMENTS

| 900719 | 7/1945 | France | 280/47.13 R |
| 423859 | 7/1947 | Italy | 280/288 |

Primary Examiner—Charles A. Marmor
Assistant Examiner—Eric Culbreth
Attorney, Agent, or Firm—Julius Rubinstein

[57] ABSTRACT

An axle wheel assembly is removably attached to the base of a suitcase by attaching a pair of brackets to opposite sides of the base of the suitcase. The upper edge of each bracket is provided with a downwardly extending slot. A pivotally mounted slot entrance cover is mounted on the bracket and is pivotal in one direction to cover the entrance to the slot to prevent the axle of the axle wheel assembly from falling out of the slot once the axle is inserted in the slot, and pivotal in another direction to open the entrance to the slot to permit the removal of the axle from the slot. The length of the axle is larger than the width of the suitcase so wheels of any size can be secured to the ends of the axle.

10 Claims, 1 Drawing Sheet

U.S. Patent  Feb. 13, 1990  4,900,043
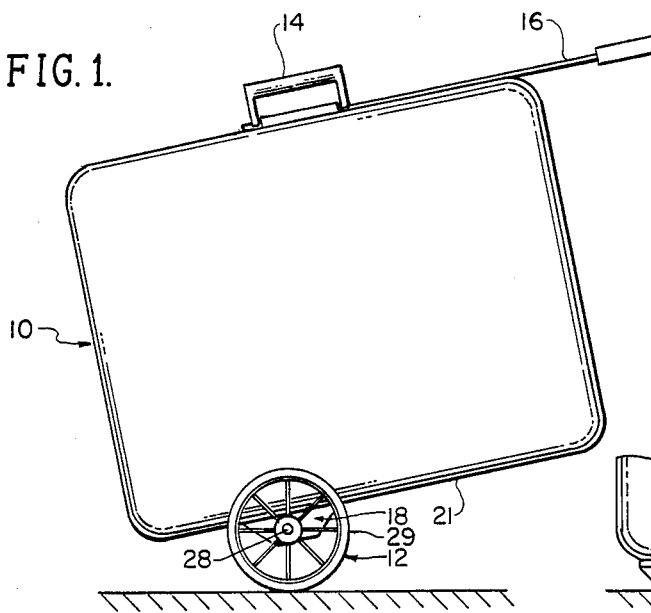
FIG. 1.
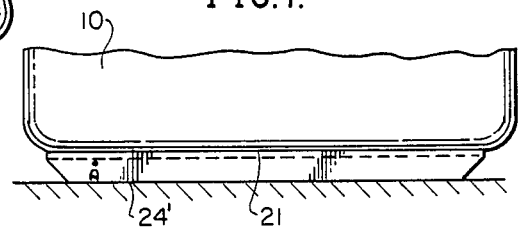
FIG. 8.
FIG. 7.
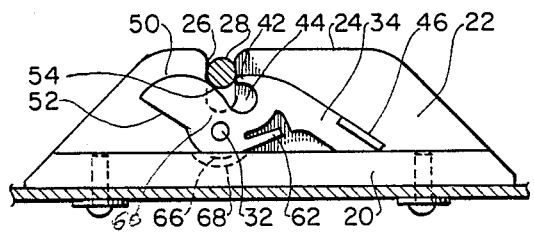
FIG. 2.
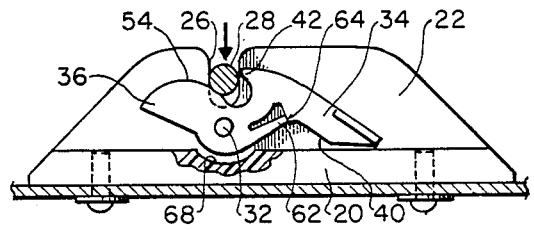
FIG. 3.
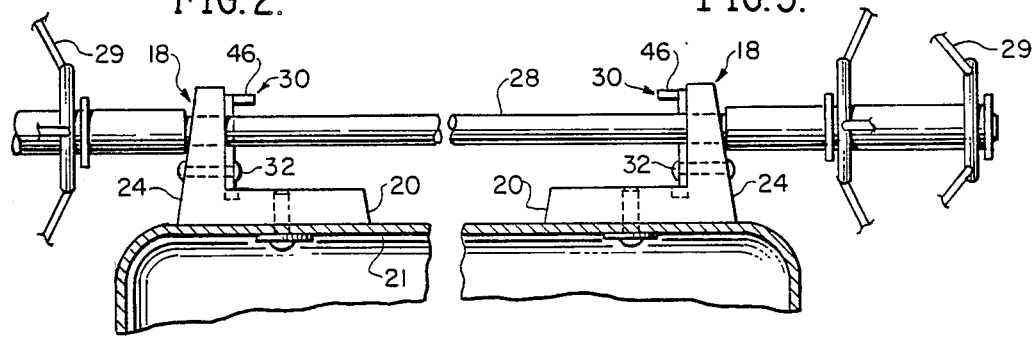
FIG. 6.
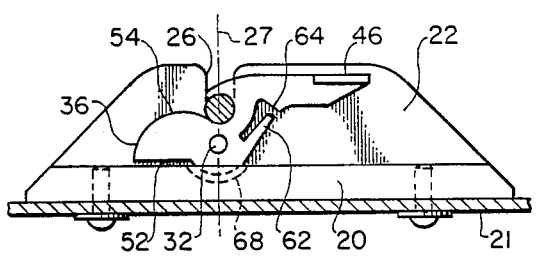
FIG. 4.
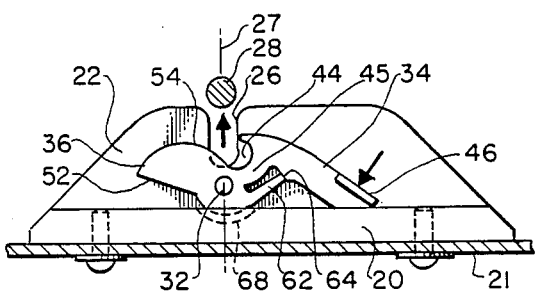
FIG. 5.

WHEEL HOLDING BRACKETS ATTACHED TO SUITCASES

This invention relates generally to a low friction attachment to manually towed article transporting devices and more particularly to a bracket attached to suitcases or the like for releasably holding a wheel and axle assembly to the bracket.

BACKGROUND AND BRIEF SUMMARY

In recent years suitcases have been built with two to four wheels permanently attached to the bottom of the suitcase for ease in pulling them instead of carrying them. These built in wheels are usually about an inch and a half in diameter. Such wheels work fine is long as the suitcases are being pulled along a smooth surface, such as in an airport, or a parking lot. However, when such suitcases have to be towed along a rough surface, such as a cobblestone street, the wheels are too small and they are generally ineffective in reducing the effort required to pull the suitcase along.

An obvious way to overcome this difficulty would be to increase the diameter of the wheels, but this would create severe problems when the suitcases have to be lifted or moved into a storage area on an airplane or bus, because the wheels would protrude so far that rough handling would damage the wheels and the wheels on the various suitcases in the storage area of an airplane or bus could become interlocked, creating great difficulty for the baggage handlers.

To overcome this problem, the larger diameter wheels would have to be removably attached to the suitcase. In the past suitcases have been constructed in such a way that the wheels could be retracted into recesses formed in the suitcase. However if larger diameter wheels are used to overcome the problem of pulling the suitcase over a rough surface, a substantial volume of the suitcase would be occupied in providing recesses for storing the wheels at the expense of the carrying capacity of the suitcase.

The concept of retracting wheels on suitcases into recesses formed into the suitcase is old as shown by the patents to McIntyre No. 2,596,578, Stilger No. 2,925,283, Lyngby No. 4,097,955, and Quinton No. 2,472,491. But the wheels disclosed in these patents where small in diameter and were no better then the current suitcases when the suitcase was pulled over rough ground.

Another approach to the concept of attaching wheels to a suitcase was to mount the wheels on a bracket which was either permanently or removably attached to the outer surface of the suitcase. This is exemplified by the patent to Hokkanen No. 1,413,852, Brower No. 2,919,138, Davis No. 2,661,220, Haft No. 4,217,675, and Walker No. 3,997,038.

All of the above described patents used small diameter wheels because they were not concerned with problems encountered when pulling the suitcase over rough surfaces. Of the above described group of patents, the patent to Walker No. 3,997,033 best lends itself to the use of large diameter wheels because as shown in FIG. 3, of Walker the axle carrying the wheels extended beyond the sides of the suitcase so the wheels 10 mounted on the axle 18 could be as large as desired. The axle 18 on which the wheels were was press fit into a slot 20 formed in the mount or bracket 13. However as admitted by Walker on column 2 lines 64 to 68, press fitting the axle into the slot was not satisfactory when the suitcase was being handled roughly, as by baggage handlers or when being towed over rough ground, because the axle structure would then separate from the suitcase. Moreover, in the course of time continued use of the Walker Structure shown in FIG. 3 would gradually widen the slot 20 so that the axle 18 would no longer be press fit in the slot and the wheel-axle assembly would tend to separate from the suitcase eventually.

To prevent this from happening, Walker disclosed another embodiment as shown in FIG. 7. In this embodiment, holes were bored through the mounts, and the axle was inserted through the bore, so that the axles could not separate from the suitcase. However this increased the cost and complexity of the axle structure.

Nonetheless, very many older suitcases still being used do not have any wheels attached to them and a structure generally like the one shown by Walker in FIG. 3 would be an economical way to provide these older suitcases with wheels. However, as admitted by Walker, the simple structure shown in FIG. 3 permits the separation of the axle structure from the suitcase when the suitcase is handled roughly or being towed over a rough surface, and as stated above, the fit between the axle and the slot 20 would become loose as the suitcase is used over a course of time.

Because of the problems inherent in the Walker structure, an important object of this invention is to improve on the teachings of Walker and provide an inexpensive and simple way to attach a bracket on the bottom of the suitcase where the bracket has a slot for receiving the axle, but where instead of relying on a pressfit between the axle and the slot in the mount or bracket to hold the axle in the slot, the axle is provided with means which positively releasably lock the wheel carrying axle into the slot on the mounts or brackets attached to the bottom of the suitcase.

These and other objects of this invention will become more apparent when better understood in the light of the specification and accompanying drawing wherein:

FIG. 1 is a side elevational view disclosing a suitcase having large removably mounted wheels attached to the bottom of the suitcase.

FIG. 2 is a side elevational view of a bracket attached to the bottom of the suitcase, showing the axle which carries the wheels being moved into the slot in the bracket.

FIG. 3 is a view similar to FIG. 2 but with the axle engaging the pivotally mounted locking means and causing the locking mean to rotate to the position shown where a portion of the locking means engages a surface of the axle.

FIG. 4 shows how continued pressure on the axle has distorted the pivotally mounted locking means enough to permit the axle to move under the resilient looped portion of the locking means, so that the resilience of the material forming the pivotally mounted locking means has caused the looped portion of the pivotally mounted locking means to snap over the axle, blocking the entrance to the slot and thus locking the axle in the slot.

FIG. 5 shows how pressure on the handle portion of the pivotally mounted locking means bends a flexible portion of the pivotally mounted locking means so that the looped portion is pivoted away from the entrance to the slot thus permitting the axle to be disengaged from the slot.

FIG. 6 show the axle assembly and brackets attached to the bottom of the suit case.

FIG. 7 discloses a modified structure wherein removal of the wheels from the brackets permits the brackets to serve as runners so that the suitcase or other article transporting device can be pulled like a sled over hard snow or ice.

FIG. 8 is an elevational view of the pivotal locking means

Referring now to FIG. 1 of the drawing, a suitcase, trash container or other article transporting device indicated generally by the reference numeral 10 is mounted on a large removably mounted wheel and axle assembly 12. For the sake of illustration, the article carrying device is described as a suitcase, but it is contemplated that this invention could be used with a variety of other article transporting containers.

The suitcase is provided with a conventional handle 14 and a pulling strap 16. A pair of mounts or brackets 18 are attached to the underside of the article to support the wheel and axle assembly 12 (see FIG. 6). The mounts or brackets 18 in this particular embodiment are generally L- shaped in cross section although other shapes are contemplated, and they comprise generally horizontal mounting bases 20 which, as shown in FIGS. 4, 5, and 6, are screwed onto the bottom 21 of the suitcase 10, and an integrally attached generally transverse portion 22 . The edge surface 24 of the transverse portion 22 is provided with a downwardly extending axle receiving slot 26 sized to receive the wheel holding rod or axle 28. For ease in explanation, in this specification, the terms downwardly and upwardly or upper and lower refer to the orientation of the drawings attached herewith. In actual practice the orientation of the parts on the suitcase could require a reversal of terms or other descriptions.

A rod or axle retaining member 30, (see FIG. 8) is pivotally mounted on pivot pin 32 on the transverse portion 22 (see FIGS. 4 and 5). The rod or axle retaining member 30 is preferably formed from a strong teflon plastic and includes a lever 34 and a lower body 36 (see FIG. 8). The lever has an upper edge 38 and a lower edge 40. The distal end 42 of the lever curves down and helps define an axle receiving slot 44 which is formed in the axle retaining member 30 and is generally transverse to the adjoining slot 26 of the bracket 18 (see FIGS. 2 and 8). The opposite end 46 of the lever 34 serves as a handle to pivot the lever in a direction which as will become apparent below, releases the rod or axle 28 from the slot 26. A narrow resilient connecting strip 45, see FIG. 8 is integral with the lever 34 and the body 36 and positioned between the ends of the lever 34 connecting the lever to the body 36 and permitting the lever to bend with respect to the body when pressure is applied to end 46. The body 36 has an upper edge 50 and a lower edge 52 (see FIGS. 2, 4 and 8). A portion 54 of the upper edge 50 is shaped to form a cam 54 spaced from the distal end 42 of the lever 34. Another part of the upper edge 50 of said body 36 extends toward the narrow resilient connecting strip 45 and curves upward at 56, see FIG. 8 to form the lower edge 58 of the narrow connecting strip 45 and then reverses direction to form the lower edge 58 of the distal end portion 42 of the lever 34 see FIG. 8. This defines the second rod or axle receiving slot 44.

The cam 54 protrudes into the first axle or rod receiving slot 26 and in such a position that when the axle or rod 28 is inserted in the slot 26 it engages the cam 54 (see FIG. 2).

The pivot of the axle retaining member 30 is located so that when the axle engages the cam 54 it causes lever 34 to pivot in a direction such that the resilient distal portion 42 of the lever 34 moves against the side of the rod or axle 28 (see FIG. 2). Referring to FIG. 5 it is noted that the pivot of said axle retaining means 30 is no closer to the handle 46 of the lever 34 than the center line 27 of the downwardly extending slot 26, and is preferably positioned along the center line 27, so no pressure exerted on the bracket 18 can cause the pivotally mounted axle retaining member 30 to pivot thus releasing the axle wheel assembly 12. The space between the resilient distal portion 42 and the cam 54 is slightly less than the diameter of the rod or axle 28 so that further downward force on the axle or rod on said cam 54 bends said resilient distal portion 42 and said cam 54 in such a way that the distance between the resilient distal portion 42 of the lever 34 and the cam 54 is increased, permitting the rod or axle to pass by the distal portion 42 of the lever 34 and reach the base 60 of the slot 26 see FIG. 4. This releases the pressure exerted by the rod or axle on the cam so that the resilience of the distal portion of the lever 34 and the narrow resilient connecting strip 45 permits the distal portion 42 of the lever 34 to snap back to its original position nearer the cam 54. This action locks the axle 28 in the second rod or axle receiving slot 44 and blocks the entrance to the slot 26 (see FIG. 4). It is to be noted that the weight of the suitcase presses the axle 28 toward the base 60 of the slot 28 so when the wheel and axle assembly 12 is mounted on the suitcase, there is no force directed against the distal end 42 of the locking member.

To release the wheel and axle assembly 12, the handle portion 46 of the lever 34 of the retaining member 30 is pushed downward slightly bending the lever 34 to the position shown in FIG. 5. This is possible because the base of the transverse slot 44 is the surface of the narrow strip 45. This strip is resilient so a small force exerted on the handle 46 of the lever 34 deflects the narrow strip member 45 so the distal end 42 of the retaining or locking member 30 moves away from the cam 54 and the slot 26 providing sufficient clearance so the axle 28 along with the mounted wheels can be removed from the slot 26.

The retaining or locking member 30 is provided with a peninsula shaped member integral with the body 36 and spaced from said narrow connecting strip and positioned so it engages a stop surface 64 on the lower edge 40 of the lever 34 thus preventing the lever 34 from bending to far and fracturing (see FIG. 5).

It is to be noted that a curved recess 68 in the base 20 is provided to accommodate the lower curved portion 66 of the axle retaining member 30 (see FIGS. 2 and 3).

In use, as shown in FIG. 6 a pair of mounting brackets 18 are secured to the base of the suitcase and the axle 28 is locked into the slots as described above. Suitably sized light weight wheels 29 are secured to the end of the axle; and these wheels project beyond the sides of the suitcase, so they can be as large in diameter as required.

If desired, the edge 24 of the brackets could be made of a suitable material so they serve as runners. With this arrangement, if the bracket 18 is elongated as shown in FIG. 7 the edge 24 can function as a runner. Thus if the ground is covered with hard snow or ice, the wheel and axle assembly 12 could be removed and the suitcase could be towed along like a sled (see FIG. 7).

Having described the invention what I claim as new is:

1. A rod retaining bracket comprising a support, said support having an upper edge surface, a first rod receiving slot extending downwardly from said edge surface into said support and terminating in a base, a rod retaining member formed from a resilient material pivotally mounted on said support, said rod retaining member comprising an upper lever and a lower body, said upper lever having opposed ends and having an upper edge and a lower edge, one end of said lever terminating in a resilient distal portion, the opposite end of said lever serving as a handle to pivot said lever to release said rod from said slot, a narrow resilient connecting strip integral with said lever and said body positioned between the ends of the lever and connected to said lower body to permit said lever to bend with respect to said body, said body having an upper edge and a lower edge, one part of said upper edge of such body shaped to form a cam spaced from a distal edge of said lever and extending toward and connected to a generally transverse edge of said narrow resilient connecting strip, said transverse edge curving upward and then reversing direction to form the lower edge of said resilient distal portion of said lever defining thereby a second rod receiving slot transverse to said first rod receiving slot, said cam positioned so it extends into said first rod receiving slot and in such a position that when said rod is inserted in said first rod receiving slot it engages said cam, the pivot of said rod retaining member positioned so when said rod engages said cam it causes said lever to pivot in a direction such that the resilient distal portion of said lever moves against the side of said rod, the space between said resilient distal portion of said lever and said cam slightly less than the diameter of said rod whereby further downward pressure by said rod against said cam bends said resilient distal portion and said narrow resilient connecting strip in such a way that said lever pivots further and the separation between the resilient distal portion of the lever and the cam is increased permitting said rod to pass by said distal portion of the lever and reach the base of said first slot thereby releasing the pressure exerted by said rod on said distal portion, so that the resilience of said distal portion of said lever and said narrow connecting strip permits said resilient distal portion to snap back its original position nearer said cam thereby locking said rod in said second rod receiving slot.

2. The rod retaining bracket described claim 1 wherein when said rod is locked is said first rod receiving slot, pressure exerted on the handle portion of said lever pivots said lever in a direction which increases the separation between the narrow distal portion of the lever and said cam enough so the rod can move out of the slot.

3. The rod retaining bracket described in claim 2 including a peninsula shaped member integral with said body member and spaced from the edge of said narrow connecting strip remote said second rod receiving slot and extending toward the lower edge of said lever and positioned so when said lever is bent to release said rod the end of said peninsula portion engages the lower edge of said lever member to prevent the lever member from bending so much that it breaks.

4. The rod retaining bracket described in claim 1 wherein when said rod is locked in said rod receiving slot, pressure exerted on the handle portion of the lever bends said distal portion of the lever and said narrow connecting portion enough to move the distal portion of said lever away from said cam far enough to permit the rod to move out of the slot.

5. The rod retaining bracket described in claim 1 wherein said slot has a base and spaced side walls defining a center line between the walls, said pivot mounted on the bracket on the center line of said slot.

6. In a luggage towing device having a base, a pair of brackets secured to the opposite sides of the base of said device, each bracket having a downwardly extending axle retaining slot sized to receive an axle, each bracket having an upper edge surface, a first axle receiving slot extending downwardly from said edge surface into said support and terminating in a base, a axle retaining member formed from a resilient material pivotally mounted on said support, said axle retaining member comprising an upper lever and a lower body, said lever having opposed ends, one end of said lever terminating in a resilient distal portion, the opposite end of said lever serving as a handle to pivot said lever to release said axle from said slot, a narrow resilient connecting strip integral with said lever and said body positioned between the ends of the lever to permit said resilient connecting strip to bend and the distal portion of the lever to move with respect to said body, said body having an upper edge and a lower edge, one part of said upper edge shaped to form a cam spaced from the distal edge of said lever, another part of said upper edge of said body extending toward and integrally connected to a generally transverse upwardly extending edge of said narrow resilient connecting strip, said upwardly extending edge of said resilient connecting strip reversing direction to form the lower edge of said distal portion of said lever defining thereby a second axle receiving slot transverse to said first axle receiving slot, said cam positioned so it extends into said first axle receiving slot and in such a position that when said axle is inserted in said first axle receiving slot it engages aid cam and pivots said lever, the pivot of said axle retaining member positioned so when said axle engages said cam it causes said lever to pivot in a direction such that the distal portion of said lever moves against the side of said axle, the space between said distal portion of said lever and said cam slightly less than the diameter of said axle whereby further downward pressure by said axle against said cam bends said resilient distal portion and said narrow resilient connecting strip in such a way that said lever pivots further and the separation between the resilient distal portion of the lever and the cam is increased permitting said axle to pass by said distal portion of the lever and reach the base of said first slot thereby releasing the pressure exerted by said axle on said cam so that the releasing the pressure exerted by said axle on said cam so that the resilience of said distal portion of said lever and said narrow connecting strip permits said distal portion to snap back its original position nearer said cam thereby locking said axle in said second axle receiving slot.

7. A bracket enabling luggage to be towed, said bracket having a downwardly extending axle receiving slot, said slot having a base and spaced walls, axle retaining means, said axle retaining means including an upper lever and a lower body, said axle retaining means mounted on a pivot on said lower body and formed from a resilient material for releasably retaining an axle in said slot, said lever having opposed ends including a resilient distal portion at one end serving to block the entrance to said slot when said retaining means is pivoted to an axle retaining position, the opposite end of said lever serving as a handle, said body having an upper edge and a lower edge, a cam formed on said upper edge of said body, said cam positioned so it extends into the said slot adjacent the base of the slot and in spaced relation to said resilient distal portion of said lever, so when an axle enters said axle receiving slot it engages said cam causing the said lever to be pivoted so the distal portion of said lever moves against the side of said axle, the space between said distal portion of said lever and said cam slightly less than the diameter of the axle whereby further force exerted by said axle against said cam increases the separation between the resilient distal portion of said lever and said cam permitting said resilient distal portion of the lever to move over the top of said axle while said axle moves to the base of said first slot whereby the pressure against said cam and said resilient distal portion is released causing the resilient distal portion of the lever to snap back to the position it had before force was exerted by said axle against said cam to lock said axle in said slot, the end of said handle positioned with respect to the pivot of said retaining means positioned so that pressure on the end of said handle rotates said lever in a direction that pivots the lever in a direction that causes the distal portion of said lever to move away from said cam and said first axle receiving slot to permit the axle to be removed from said slot.

8. The bracket described in claim 7 wherein said pivot point of said retaining means is along the center line of said slot so that force exerted by said axle against the distal portion of said lever when said retaining means is in a axle retaining position cannot pivot said retaining means in any direction.

9. A piece of luggage having a base, a pair of brackets secured to the opposite sides of the base of said luggage, each bracket having a downwardly extending axle retaining slot sized to receive an axle, each slot having a base and spaced walls, axle retaining means formed from a resilient material and mounted on a pivot on said said bracket, said axle retaining means including an upper lever and a lower body, said lever having opposed ends with a resilient distal portion at one end serving to block the entrance to said slot when said retaining means is pivoted to an axle retaining position, the opposite end of said lever serving as a handle, said body having an upper edge and a lower edge, said cam formed on said upper edge and positioned so it extends into the said slot adjacent the base of said slot in spaced relation to said resilient distal portion of said lever, so when an axle enters said axle receiving slot and engages said cam, the said lever is pivoted so the distal portion of said lever moves against the side of said axle, the space between said distal portion of said lever and said cam slightly less than the diameter of the axle whereby further force exerted by said axle against said cam increases the separation between the resilient distal portion of said lever and said cam permitting said resilient distal portion of the lever to move over the top of said axle while said axle moves to the base of said first slot whereby the pressure against said cam and said distal portion is released permitting said resilient distal portion of the lever to snap back to its original position nearer the cam to block the entrance to said first axle receiving slot and thereby lock said axle in said slot, the end of said handle positioned with respect to the pivot point of said retaining means so that pressure on the end of said handle rotates said lever in a direction that causes the resilient distal portion of said lever to move away from said cam and said first axle receiving slot to permit the axle to be removed from said slot.

10. The bracket described in claim 9 wherein said pivot point of said retaining means is along the center line of said slot so that force exerted by said axle against the distal portion of said lever when said lever is in an axle retaining position, does not pivot said lever in any direction.

* * * * *